United States Patent
Ikeda (10) Patent No.: US 8,427,555 B2
(45) Date of Patent: Apr. 23, 2013

(54) IMAGING APPARATUS FOR DISPLAYING AN AREA WIDER THAN A RECORDING AREA

(75) Inventor: Hitoshi Ikeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 303 days.

(21) Appl. No.: 12/813,309

(22) Filed: Jun. 10, 2010

(65) Prior Publication Data

US 2010/0315527 A1 Dec. 16, 2010

(30) Foreign Application Priority Data

Jun. 15, 2009 (JP) ................................. 2009-141880

(51) Int. Cl.
 *H04N 5/262* (2006.01)
 *H04N 5/222* (2006.01)

(52) U.S. Cl.
 USPC .................................. 348/240.2; 348/333.03

(58) Field of Classification Search ............. 348/240.99, 348/240.1, 240.2, 333.01, 333.02, 333.03
See application file for complete search history.

(56) References Cited

U.S. PATENT DOCUMENTS

| | | | | |
|---|---|---|---|---|
| 7,224,393 | B2 * | 5/2007 | Ojima et al. ............. | 348/333.03 |
| 7,701,491 | B2 * | 4/2010 | Abe et al. .................... | 348/240.2 |
| 8,294,805 | B2 * | 10/2012 | Kita .......................... | 348/333.02 |
| 2004/0201767 | A1 * | 10/2004 | Niikawa et al. .......... | 348/333.03 |
| 2010/0157128 | A1 * | 6/2010 | Choi et al. ................ | 348/333.03 |
| 2010/0214449 | A1 * | 8/2010 | Shimizu ..................... | 348/240.2 |
| 2010/0321536 | A1 * | 12/2010 | Lee et al. .................. | 348/240.99 |
| 2011/0242369 | A1 * | 10/2011 | Misawa et al. ............. | 348/240.2 |
| 2012/0038796 | A1 * | 2/2012 | Posa et al. .................. | 348/240.2 |

FOREIGN PATENT DOCUMENTS

| | | | |
|---|---|---|---|
| JP | 2004-252370 A | | 9/2004 |
| JP | 2004-343363 A | | 12/2004 |
| JP | 2006-014221 A | | 1/2006 |
| JP | 2006019882 A | * | 1/2006 |
| JP | 2008096582 A | * | 4/2008 |
| JP | 2009-071592 A | | 4/2009 |

OTHER PUBLICATIONS

Translation of JP 2006-014221 A.*
Translation of JP 2009-071592 A.*
Translation of JP 2004-343363 A.*
U.S. Appl. No. 12/797,519, filed Jun. 9, 2010, Hitoshi Ikeda.

* cited by examiner

*Primary Examiner* — John Villecco
(74) *Attorney, Agent, or Firm* — Canon U.S.A., Inc. IP Division

(57) ABSTRACT

An apparatus that can display an area wider than a recording area as a display area in a zoom mode, in which a portion of an imaging area is clipped and recorded, includes an image processing unit that keeps constant or increases a ratio of a display area to a clipped recording area when the size of clipped recording areas is made gradually smaller relative to the imaging area, and keeps constant or decreases the ratio of the display area to the clipped recording area when the size of clipped recording area is gradually made larger relative to the imaging area.

8 Claims, 5 Drawing Sheets

IMAGING APPARATUS FOR DISPLAYING AN AREA WIDER THAN A RECORDING AREA

BACKGROUND OF THE INVENTION

1. Field of the Invention

The present invention relates to an imaging apparatus capable of framing while displaying an area wider than an area to be recorded.

2. Description of the Related Art

In a conventional digital camera, while an image formed on an image sensor is displayed on a display screen of a view finder on a camera body, a still image captured at a user's desired timing is recorded one scene after another into a memory card, for example.

Most of digital cameras are equipped with an optical zoom function to zoom in or out an imaging area of an object to a desired magnification while controlling a lens system in an optical section in response to a user's operation. Moreover, the digital cameras also carry an electronic zoom function to perform interpolation and enlargement by executing a predetermined image processing to a part of an image formed on the image sensor.

When a user takes a photo by using the electronic zoom function described above, if the object is stationary, the object can be captured in an imaging area easily by zooming in with a desired magnification. When a user attempts to zoom in on relatively fast-moving objects in an athletic or a sports event, for example, it has been difficult to keep tracking on the object in an imaging area.

To solve the issue, Japanese Patent Application Laid-Open No. 2006-14221 discusses a technology that utilizes a peripheral portion, which is not used for recording images, out of the light-receiving area of an image sensor, and displays the peripheral portion, as well as an image to be recorded, on the display screen of a view finder (hereafter referred to as a Wide View).

According to Japanese Patent Application Laid-Open No. 2006-14221, the peripheral area of a recording area displayed on the Wide View can be changed according to a user's instruction. However, since interlocking with a zoom operation is not considered in this technology, bothersome operations are needed, such as expanding a peripheral area in the Wide View after a zoom-in operation and decreasing the peripheral area in the Wide View after a zoom-out operation, for example.

SUMMARY OF THE INVENTION

According to an aspect of the present invention, an apparatus includes an imaging unit which captures an image of an object, a display unit which displays the captured image, and a control unit capable of displaying an area wider than a recording area as a display area on the display unit in a zoom condition, in which a portion of an imaging area is clipped and recorded. The image is displayed in such a manner that a ratio of the display area to a first clipping area clipped from the imaging area becomes greater than a ratio of the display area to a second clipping area clipped from the imaging area, the second clipping area being larger than the first clipping area.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
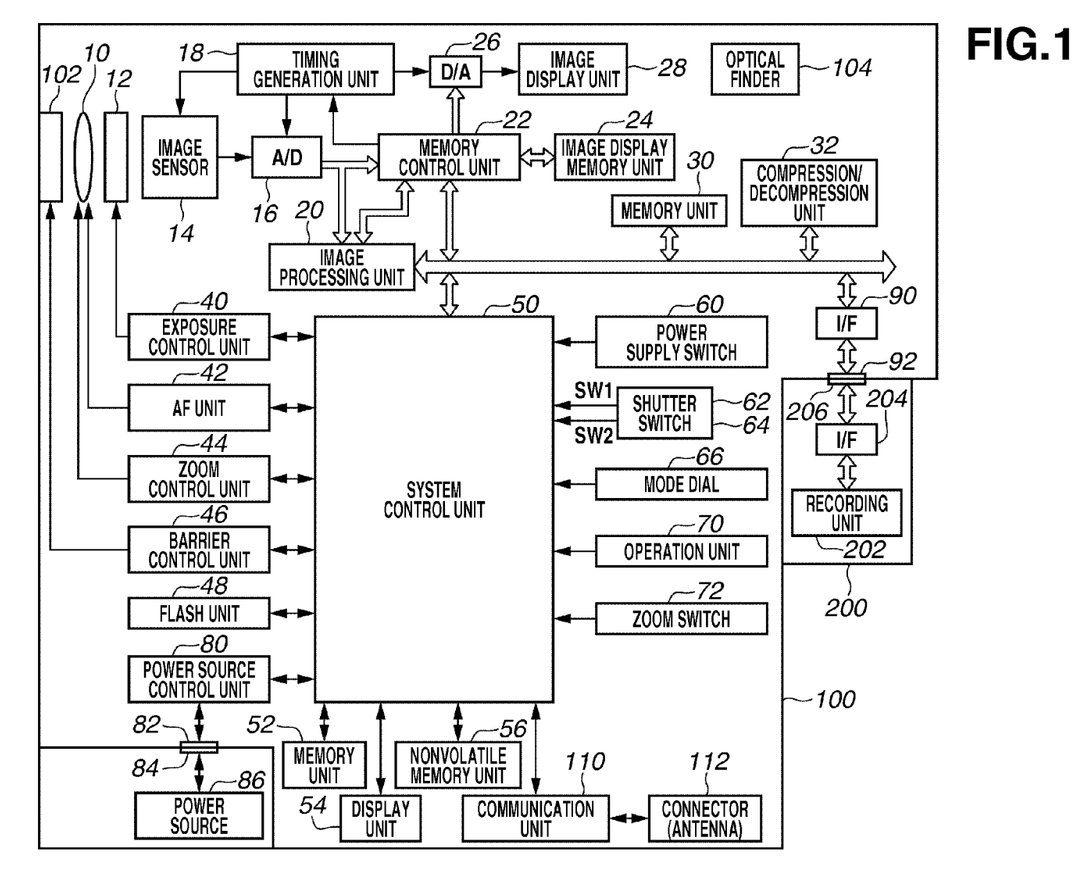
FIG. 1 is a block diagram illustrating a structure of an imaging apparatus according to an exemplary embodiment of the present invention.

FIG. 1 is a block diagram illustrating a structure of an imaging apparatus according to an exemplary embodiment of the present invention. In FIG. 1, the imaging apparatus 100 includes a photographic lens 10, a shutter 12 including a diaphragm function, an image sensor 14, and A/D converter 16. A timing generation unit 18, which supplies a clock signal and control signals to the image sensor 14, the A/D converter 16, and a D/A converter 26, is controlled by a memory control unit 22 and a system control unit 50 to be described below.

An image processing unit 20 performs predetermined processing, such as pixel interpolation and color conversion, on data from the A/D converter and data from the memory control unit 22. The image processing unit 20 clips a part of an image and performs variable magnification processing on a clipped image to implement the electronic zoom function. The image processing unit 20 performs a predetermined arithmetic processing by using captured image data. Based on an obtained result of the arithmetic processing, the system control unit 50 causes an exposure control unit 40 and an autofocus (AF) control unit 42 to perform processing, such as through the lens (TTL) system autofocus (AF) processing, auto-exposure (AE) processing, auto-white balance (AWB) processing, and flash pre-emission (EF) processing.

The memory control unit 22 controls the A/D converter 16, the timing generation unit 18, the image processing unit 20, an image display memory 24, the D/A converter 26, a memory 30, and a compression/decompression unit 32. Data from the A/D converter 16 is transmitted through the image processing unit 20 and the memory control unit 22 or directly passes through the memory control unit 22, and written in the image display memory 24 or the memory 30 to be described later.

Image data for display is output from the image display memory 24, converted by the D/A converter 26, and displayed on an image display unit 28, including a TFT LCD. An electronic viewfinder can be implemented by sequentially displaying captured image data on the image display unit 28. The image display unit 28 can be turned ON and OFF arbitrarily by an instruction from the system control unit 50, and by turning the display OFF, the power consumption of the imaging apparatus 100 can be substantially reduced.

The memory 30 stores captured still images and moving images. The memory 30 can be used as a work area for the system control unit 50.

The compression/decompression unit 32 compresses or decompresses image data by adaptive discrete cosine transform (ADCT) or wavelet transform, for example. The compression/decompression unit 32 reads an image from the memory 30, performs compression or decompression processing on the image, and writes the processed data in the memory 30. The exposure control unit 40 controls a shutter 12 with a diaphragm function. The AF unit 42 controls focusing of the photographic lens 10, a zoom control unit 44 controls optical zooming of the photographic lens 10, and a barrier control unit 46 controls the operation of a protective member 102 as a protective lens barrier. A flash light 48 includes an AF assist light projecting function, and a flash pre-emission function.

A system control unit 50 controls the entire imaging apparatus 100, and a memory 52 stores constants, variables, and a program for the system control unit 50. A display unit 54 is, for example, a liquid crystal display to indicate an operating status or messages by using characters or images according to results of program execution in the system control unit 50. This display unit 54 is formed by a combination of an LCD and an LED, and arranged at one place or at multiple places near the operation unit of the imaging apparatus 100 in such a position where it is easy to look at. The display unit 54 has a part of its function mounted inside an optical finder 104.

A non-volatile memory 56, which can be recorded and erased electrically, is an EEPROM, for example. The system control unit 50 includes operation members, by which a user inputs various operation instructions, such as a power supply switch (main switch) 60, a switch (SW1) 62, a switch (SW2) 64, a mode dial 66, an operation unit 70, and a zoom switch 72. Those operation members include one or a combination of switches, dials, a touch panel, a pointing device by line-of-sight detection, and a sound recognition device.

The operation unit 70 includes an electronic teleconverter setting button. The zoom switch 72 includes a TELE switch to perform zooming to a telephoto side, and a WIDE switch to perform zooming to a wide-angle side. By using this zoom switch 72, the user can instruct the zoom control unit 44 to zoom the photographic lens 10, perform an optical zooming operation, clip an image by the image processing unit 20, perform variable magnification processing, or perform electronic zoom operation.

A power supply control unit 80 is connected through a connector 82 and a connector 84 to a power supply unit 86, which includes a primary power supply, a secondary power supply, or an AC adapter, for example. An interface 90 is an interface connected via a connector 92 to recording media, such as a memory card and a hard disk.

The protective member 102 is a protective barrier to cover an imaging section, including the lens 10 of the imaging apparatus, to prevent the imaging unit from getting dirty or damaged. An optical finder 104 enables photographing only by using the optical finder 104 without using the electronic viewfinder function by the image display unit 28.

A communication unit 110 is compliant with various communication functions, such as RS232C, USB, IEEE1394, P1284, SCSI, modem, LAN, and wireless communication. A connector 112 connects the imaging apparatus 100 to external devices by using the communication unit 110, and also may serve as an antenna in wireless communication.

A storage unit 200 includes, for example, a memory card, a hard disk, or the like. The storage unit 200 includes a recording unit 202 formed by a semiconductor memory or a magnetic disk, for example, and also includes an interface 204 with the imaging apparatus 100, and a connector 206 to connect thereof to the imaging apparatus 100.

The operations of main parts in the exemplary embodiment of the present invention will be described below with reference to FIGS. 2 to 5.

Figure 2:
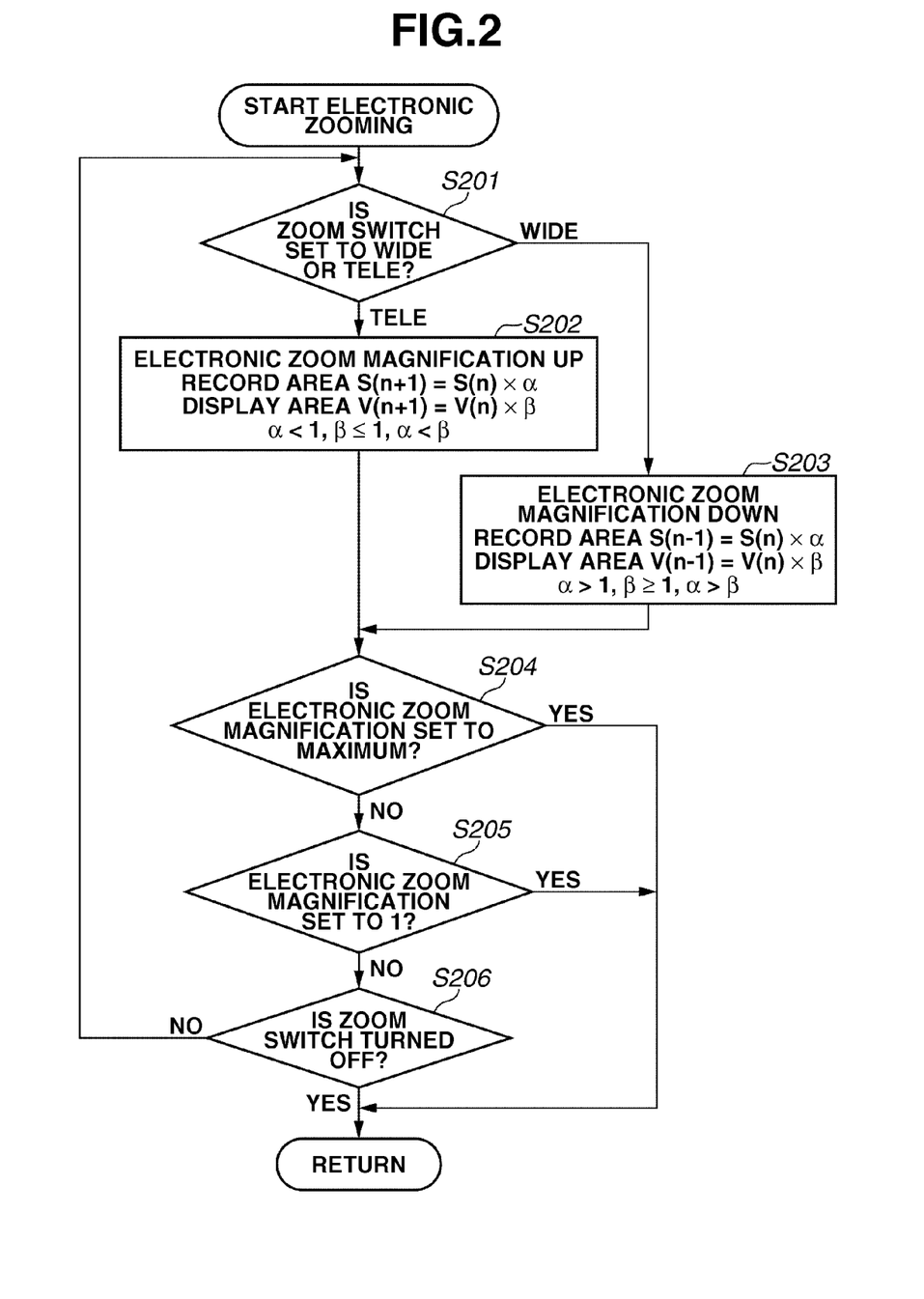
FIG. 2 is a flowchart illustrating operations in electronic zoom processing according to an exemplary embodiment of the present invention.

FIG. 2 is a flowchart illustrating the operations in electronic zooming in the imaging apparatus 100 according to the present exemplary embodiment.

When the zoom switch 72 is operated, the system control unit 50 starts the electronic zoom processing. In the electronic zoom processing, the system control unit 50 clips a partial area of an image formed on the image sensor 14 by using the image processing unit 20, and performs enlargement processing by pixel interpolation, for example, or reduction processing by pixel skipping, for example. Zoom effects can be obtained by compressing an image using the compression/decompression unit 32, and then recording a compressed still image in the recording unit 202 of the storage unit 200.

The recording angle of view is changed by enlarging or reducing an area to be clipped by using the image processing unit 20 from the image formed on the image sensor 14 in response to an operation by the zoom switch 72. At this time, a display in the electronic viewfinder of the image display unit 28 is controlled as described below. As a result, an imaging apparatus can be provided, which includes an improved function of framing a fast-moving object regardless of zoom magnification and without the need to perform any bothersome operation.

In FIG. 2, the system control unit 50, in step S201, checks the state of the zoom switch 72. If the TELE switch is ON (TELE in step S201), then, the processing proceeds to step S202. In step S202, a recording area, in other words, an area to be clipped from an image by the image processing unit 20 in recording is decreased, and the electronic zoom magnification is increased (UP). In this manner, the angle of view is changed to the telephoto side, and the display area is reduced.

At this time, if the recording area size at an electronic zoom position n is designated as S(n), and a display area size is designated as V(n), a recording area and a display area are set to satisfy equations (1).

$$S(n+1) = S(n) \times \alpha \, (\alpha < 1)$$

$$V(n+1) = V(n) \times \beta \, (\beta \leq 1) \tag{1}$$

$\alpha$ and $\beta$ are coefficients. The object is more likely to disappear from the screen as the electronic zoom magnification is made higher. Therefore, an inequality $\alpha < \beta$ needs to be satisfied to make the area displayed outside of the recording area greater as the electronic zoom magnification is gradually increased (UP), in other words, to make the ratio of the recording area to the display area smaller. At this time, the electronic zoom magnification M(n) at an electronic zoom position n is expressed by equation (2). S(0) is a recording area size at an electronic zoom position 0 in which the electronic zoom magnification is 1.

$$M(n) = S(0)/S(n) \tag{2}$$

On the other hand, if the WIDE switch is ON in step S201 (WIDE in step S201), the system control unit 50 advances the processing from step S201 to step S203. The recoding area, namely, an area to be clipped from an image by the image processing unit 20 is increased, and the electronic zoom magnification is decreased (DOWN). In this manner, the angle of view is changed to the wide angle side, and the display area is made larger.

In this processing, when a recording area size at an electronic zoom position n is designated as S(n) and a display area size is designated as V(n), a recording area and a display area are set to satisfy equations (3).

$$S(n-1) = S(n) \times \alpha \quad (\alpha > 1)$$

$$V(n-1) = V(n) \times \beta \quad (\beta \geq 1) \quad (3)$$

α and β are coefficients. An inequality α>β needs to be satisfied to make the area displayed outside of the recording area smaller as the electronic zoom magnification is gradually reduced (DOWN), in other words, to make the proportion of the recording area to the display area greater.

So far, the recording area size and the display area size are set by equations (1) and (3). However, a table may be prepared to store the recording area sizes and the display area sizes at respective electronic zoom positions, and each recording area size and each display area size may be set by referring to the table when needed.

By making an arrangement as described, it is possible to control the imaging apparatus 100 so that the peripheral area in the Wide View becomes larger as the electronic zoom magnification is increased (UP), and it is also possible to control the imaging apparatus 100 to prevent such a problem that the peripheral area becomes too large and the recording area in the display screen becomes too small. Therefore, images can be displayed with the easy framing without burdensome operations.

In step S204, the system control unit 50 determines whether the electronic zoom magnification is at a maximum, and if it is determined that the electronic zoom magnification is at the maximum (YES in step S204), the electronic zoom processing is finished. If the electronic zoom magnification is not at the maximum (NO in step S204), the processing proceeds to step S205. In step S205, the system control unit 50 determines whether the electronic zoom magnification is 1×, in other words, whether electronic zoom is not used. If it is determined that the electronic zoom magnification is 1× (YES in step S205), the electronic zoom processing is finished.

If the electronic zoom magnification is not 1× (NO in step S205), the system control unit 50 advances the processing from step S205 to step S206, and checks the state of the zoom switch 72. If the zoom switch 72 is OFF (YES in step S206), the electronic zoom processing is finished. If the zoom switch is ON (NO in step S206), the processing returns to step S201, and the system control unit 50 repeats the same operations as described above.

Figure 3:
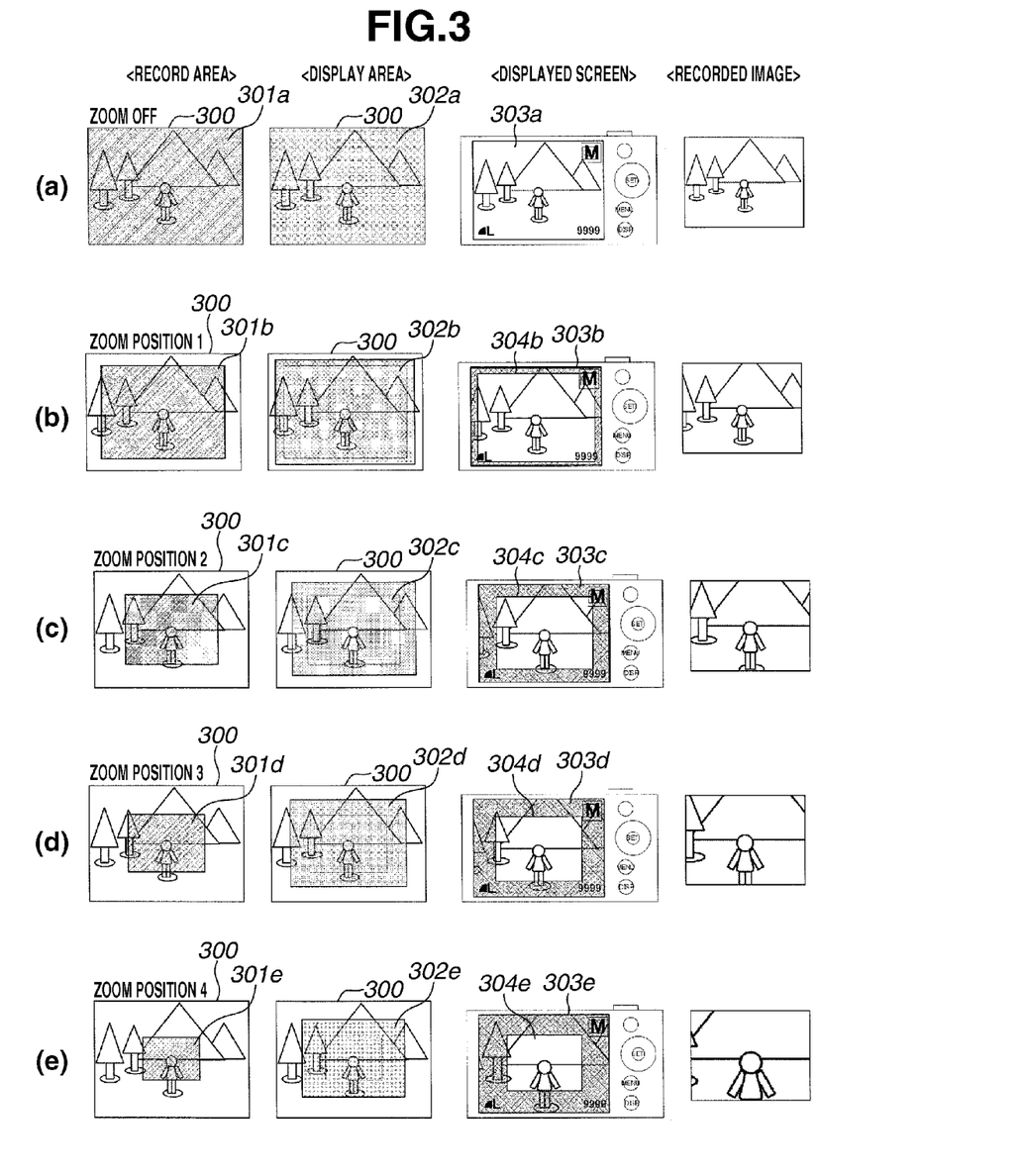
FIG. 3 illustrates recording areas, display areas in electronic zoom processing according to an exemplary embodiment of the present invention.

FIG. 3 illustrates an example of recording areas, display areas, display images, recorded images according to the exemplary embodiment.

In FIG. 3, an imaging area 300 corresponds to a full size of an image sensor 14, and recording areas 301a to 301e are captured at electronic zoom positions (a) to (e), which are also named as a zoom-off position, and zoom positions 1 to 4. Display areas 302a to 302e are captured at the electronic zoom positions (a) to (e). Display screen images 303a to 303e indicate how they look at the electronic zoom positions (a) to (e). Frames 304b to 304e indicate recording ranges captured at the electronic zoom positions (b) t (e).

As the electronic zoom magnification is increased from (a) to (e), the recording area decreases in size from the recording area 301a to 301e relative to the imaging area 300 of the image sensor 14. Similarly, the display area decreases in size from the display area 302a to the display area 302e relative to the imaging area 300. However, since a change rate of the display area is smaller than a change rate of the recording area, the ratio of the display area to the recording area becomes greater gradually. As a result, as is obvious from the display screen images 303b to 303e, as the electronic zoom magnification is increased, the peripheral area of the Wide View becomes greater.

An electronic teleconverter mode is a mode in which an optical zoom operation can be performed while the electronic zoom magnification is kept constant, in other words, while the area to be clipped from an image and recorded is maintained constant. Similar effects can be obtained as if a teleconverter were attached to an optical lens.

Figure 4:
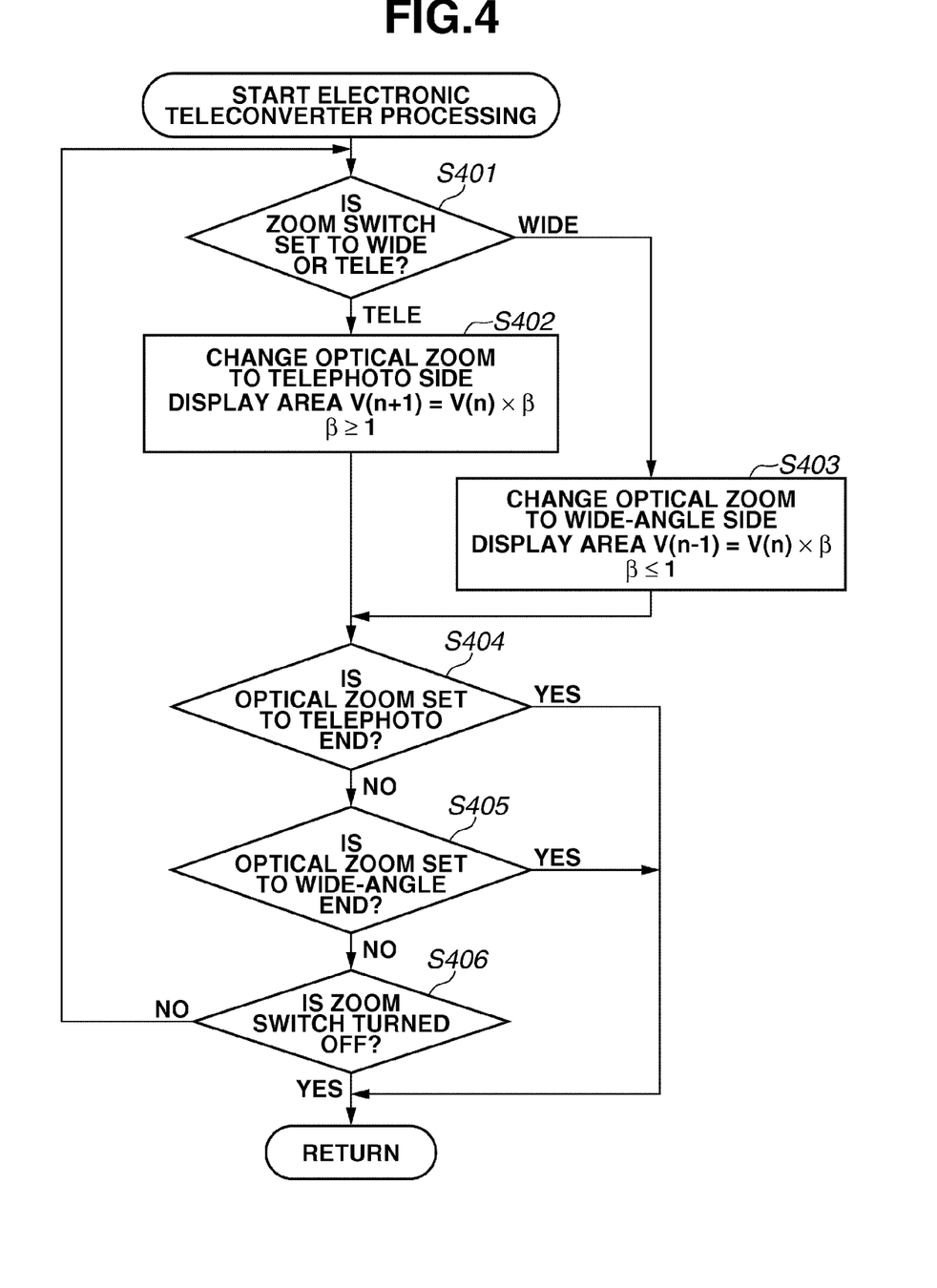
FIG. 4 is a flowchart illustrating operations in electronic teleconverter processing according to an exemplary embodiment of the present invention.

FIG. 4 is a flowchart illustrating the operations when the electronic teleconverter processing is performed in the imaging apparatus 100 according to the present exemplary embodiment.

The system control unit 50 sets the imaging apparatus 100 in an electronic teleconverter mode by an electronic teleconverter setting button (not illustrated) on the operation unit 70 or by an instruction to set the electronic teleconverter mode by a menu operation. Like in the electronic zoom operation, in an electronic teleconverter processing, a partial area is clipped from an image formed on the image sensor 14 by using the image processing unit 20, and clipped image data is subjected to a enlargement processing by pixel interpolation or to a reduction processing by pixel skipping, and the image data is recorded in the recording unit 202. The recording angle of view is changed by an optical zooming, which changes the shooting angle of view of the photographic lens 10 by the zoom control unit 44 in response to a user's operation of the zoom switch 72. For this reason, such effects can be obtained as if a teleconverter were mounted on the photographic lens 10.

In FIG. 4, the system control unit 50 starts zoom processing in the electronic teleconverter mode when the zoom switch 72 is operated to change the optical zoom magnification. In step S401, the system control unit 50 checks the state of the zoom switch 72, and if the TELE switch is ON (TELE in step S401, the processing proceeds to step S402, and instructs the zoom control unit 44 to change the shooting angle of view of the photographic lens 10 to the telephoto side, increases the optical zoom magnification (UP), and increases the display area.

In the above operation, when a display area size at an optical zoom position n is designated as V(n), a display area is set to satisfy equation (4). β is a coefficient.

$$V(n+1) = V(n) \times \beta \quad (\beta \geq 1) \quad (4)$$

On the other hand, if the WIDE switch is ON (WIDE in step S401), the system control unit 50 advances the processing from steps S401 to S403, and instructs the zoom control unit 44 to change the shooting angle of view of the photographic lens 10 to the wide angle side, decreases the optical zoom magnification (DOWN), and increases the display area.

In the above operation, when a display area size at an optical zoom position n is designated as V(n), a display area is set to satisfy equation (5). β is a coefficient.

$$V(n-1) = V(n) \times \beta \quad (\beta \leq 1) \quad (5)$$

So far, the recording area size and the display area size are set by equations (4) and (5). However, a table may be prepared to store the recording area sizes and the display area sizes at respective electronic zoom positions, and each recording area size and each display area size may be set by referring to the table when necessary.

Since the size of the area to be clipped and recorded is kept constant in electronic teleconverter processing, by making an above-described arrangement, it is possible to control the imaging apparatus 100 so that the peripheral area of the Wide View becomes larger as the optical zoom magnification is increased, so that images can be displayed with easy framing without any bothersome operation.

In step S404, the system control unit 50 determines whether the optical zoom is at the telephoto end. If it is determined that the optical zoom is at the telephoto end (YES in step S404), the zoom processing in the electronic teleconverter mode is finished. If it is determined that the optical zoom is not at the telephoto end (NO in step S404), the processing proceeds to step S405. In step S405, the system control unit 50 determines whether the optical zoom is at a wide angle end. If the optical zoom is at the wide angle end (YES in step S405), the zoom processing in the electronic teleconverter mode is finished.

On the other hand, if the optical zoom is not at the wide angle end (NO in step S405), the system control unit 50 advances the processing to step S406, checks the state of the zoom switch 72. If the zoom switch is OFF (YES in step S406), the zoom processing in the electronic teleconverter mode is finished. If the zoom switch is ON (NO in step S406), the processing returns to step S401, and the same operation is repeated.

Figure 5:
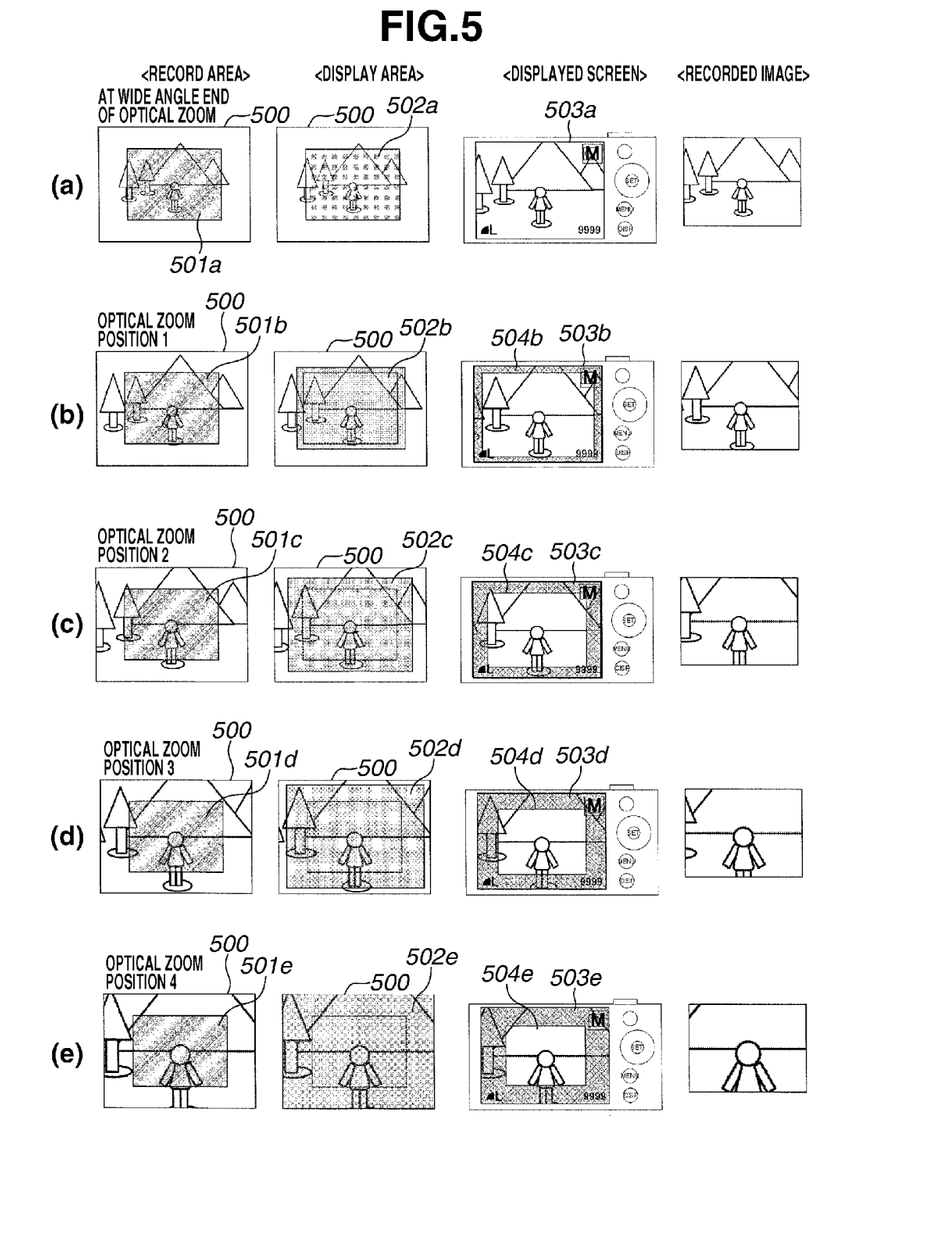
FIG. 5 illustrates recording areas, display areas in electronic teleconverter processing according to an exemplary embodiment of the present invention.

FIG. 5 illustrates an example of recording areas, display areas, display screen images, and recorded images in electronic teleconverter processing.

In FIG. 5, an imaging area 500 corresponds to a full size of an image sensor 14, and recording areas 501a to 501e are captured at optical zoom positions (a) to (e), which are also named as an optical zoom wide-angle end, and optical zoom positions 1 to 4. Display areas 502a to 502e are captured at the optical zoom positions (a) to (e). Display screen images 503a to 503e are examples of how they look at the optical zoom positions (a) to (e). Frames 504b to 504e indicate recording areas captured at the optical zoom positions (b) to (e).

Unlike with electronic zooming, in electronic teleconverter processing, even though the optical zoom magnification is increased from (a) to (e), the recorded areas 501a to 501e are maintained constant relative to an imaging area 500 of the image sensor 14. On the other hand, the display areas 502a to 502e stay equal to or become larger compared with the recording areas 501a to 501e. For this reason, in the displayed screen images 503b to 503e, as the optical zoom magnification is increased, the peripheral areas in the Wide View become larger.

Since the peripheral areas in the Wide View can be made larger as the zoom magnification is increased linked with a zooming operation, it is possible to provide a user-friendly imaging apparatus capable of displaying images with improved easy framing without relaying on zoom magnification and without bothersome operation. Briefly, the above mentioned embodiment can provide an imaging apparatus with easy framing of a fast-moving object without having to worry about zoom magnification or complicated operation.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-141880 filed Jun. 15, 2009, which is hereby incorporated by reference herein in its entirety.

What is claimed is:

1. An apparatus comprising:
  an imaging unit configured to capture an image of an object;
  a display unit configured to display the captured image;
  an instruction unit configured to give an instruction to make a size of a recording area smaller, in which an image is to be recorded, in an imaging area of the imaging unit; and
  a control unit configured to display an image of a display area, which is wider than the recording area and includes the recording area, in the imaging area of the imaging unit,
  wherein a size of the display area and the recording area is changed smaller in response to the instruction, and
  the smaller the size of the recording area instructed by the instruction unit is, the more the ratio of the display area to the recording area is increased.

2. The apparatus according to claim 1, wherein the display unit displays a frame indicating the recording area.

3. The apparatus according to claim 1, further comprising:
  a clipping unit configured to clip an image of the recording area; and
  a recording unit configured to record the clipped image.

4. A method comprising:
  capturing an image of an object;
  displaying the captured image;
  giving an instruction to make a size of a recording area smaller, in which an image is to be recorded, in an imaging area of an imaging unit; and
  displaying an image of a display area, which is wider than the recording area and includes the recording area, in the imaging area of the imaging unit,
  wherein a size of the display area and the recording area is changed smaller in response to the instruction, and
  the smaller the size of the recording area instructed by the instruction unit is, the more the ratio of the display area to the recording area is increased.

5. An apparatus for displaying an area wider than a recording area as a display area in a converter mode in which a portion of the imaging area is recorded, the apparatus comprising:
  an imaging unit configured to capture an image of an object;
  a display unit configured to display the captured image;
  an instruction unit configured to give an instruction to make a zoom state nearer to a tele angle side; and
  a control unit configured to display an image of a display area, which is wider than a recording area and includes the recording area, in the imaging area of the imaging unit,
  wherein the nearer the zoom state to a tele angle side instructed by the instruction unit is, the larger the size of the display area becomes.

6. The apparatus according to claim 5, wherein the display unit displays a frame indicating the recording area.

7. The apparatus according to claim 5, further comprising:
  a clipping unit configured to clip an image of the recording area; and
  a recording unit configured to record the clipped image.

8. A method for displaying an area wider than a recording area as a display area in a converter mode in which a portion of the imaging area is recorded, the method comprising:
  capturing an image of an object;
  displaying the captured image; and
  giving an instruction to make a zoom state is nearer to a tele angle side; and
  displaying an image of a display area, which is wider than a recording area and includes the recording area, in the imaging area of an imaging unit, wherein the nearer the zoom state to a tele angle side instructed by the instruction unit, the larger the size of the display area is.

* * * * *